United States Patent [19]

Deeds

[11] Patent Number: 4,639,876
[45] Date of Patent: Jan. 27, 1987

[54] MULTI-UNIT ENERGY USE MONITOR

[76] Inventor: Robert G. Deeds, 214 N. Harvard, Villa Park, Ill. 60181

[21] Appl. No.: 663,447

[22] Filed: Oct. 22, 1984

[51] Int. Cl.$^4$ .................. G01R 19/00; G01K 17/06
[52] U.S. Cl. .................. 364/483; 165/11.1; 236/94; 364/550; 364/557; 377/13; 377/15; 374/39
[58] Field of Search ............... 364/138, 483, 493, 510, 364/550, 557; 377/13, 15, 16; 236/1 B, 1 C, 94; 165/11; 374/39

[56] References Cited

U.S. PATENT DOCUMENTS

| | | | |
|---|---|---|---|
| 3,724,534 | 4/1973 | Weatherston | 236/1 B |
| 3,979,952 | 9/1976 | Bornstein et al. | 374/39 |
| 4,002,890 | 1/1977 | Welin | 364/557 |
| 4,041,281 | 8/1977 | Gaudeul | 377/16 |
| 4,193,006 | 3/1980 | Kabat et al. | 236/1 C |
| 4,206,346 | 6/1980 | Hirosawa et al. | 377/15 |
| 4,221,260 | 9/1980 | Otala et al. | 165/11.1 |
| 4,234,927 | 11/1980 | First | 364/557 |
| 4,308,911 | 1/1982 | Mandl | 165/11.1 |
| 4,437,771 | 3/1984 | Cazzaniga | 236/94 |
| 4,484,620 | 11/1984 | McHugh | 236/94 |
| 4,530,395 | 7/1985 | Parker et al. | 236/1 C |
| 4,591,988 | 5/1986 | Klima et al. | 374/39 |

Primary Examiner—Errol A. Krass
Assistant Examiner—Kevin J. Teska
Attorney, Agent, or Firm—Robert F. Van Epps

[57] ABSTRACT

A system for monitoring energy use by each of a plurality of tenants or other users of energy provided by a common heating/cooling plant and for allocating the energy expense for a building among such users on a pro-rata basis.

6 Claims, 1 Drawing Figure

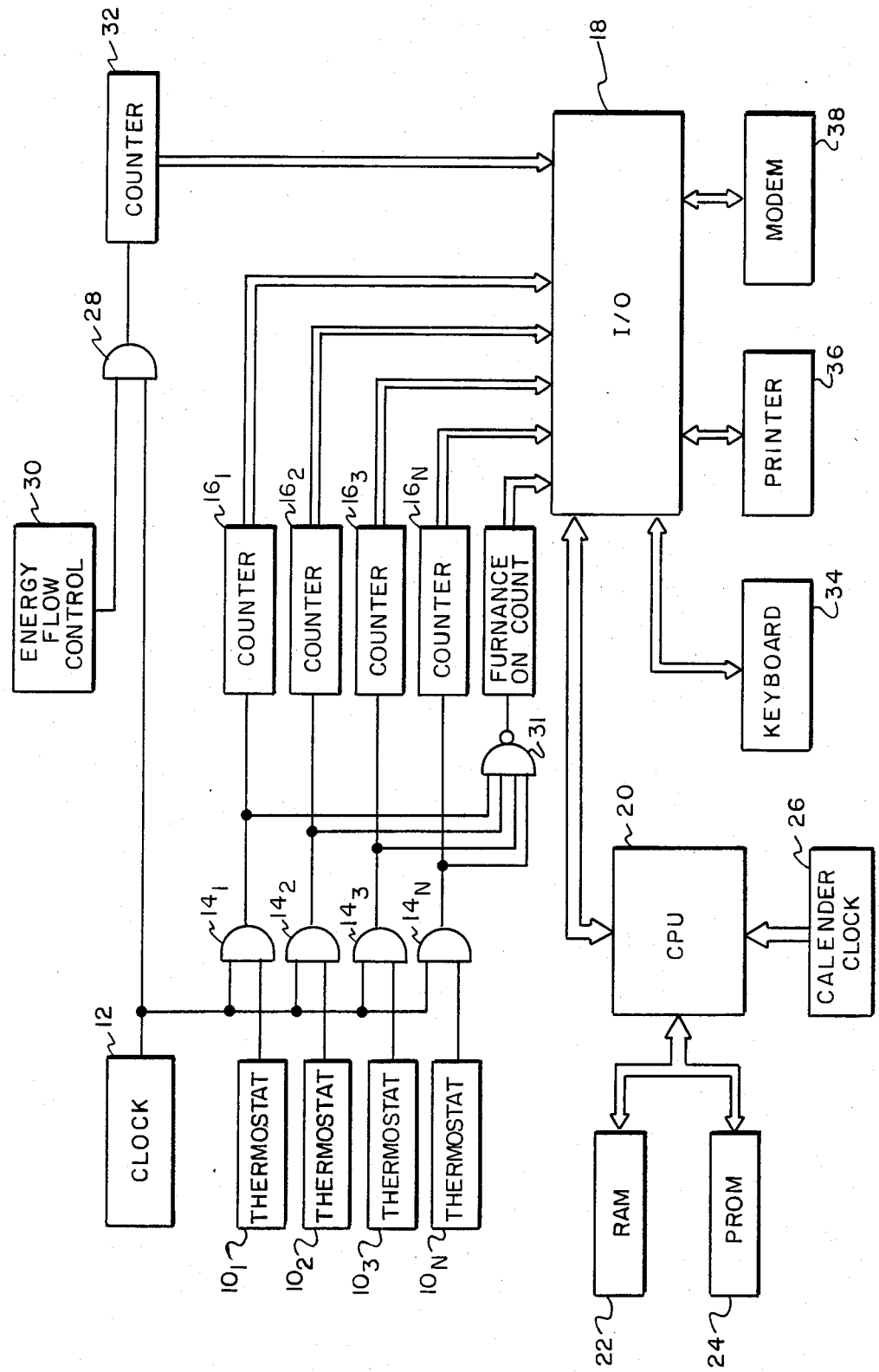

MULTI-UNIT ENERGY USE MONITOR

BACKGROUND OF THE INVENTION

1. Field of the Invention

The present invention relates generally to the field of heating and cooling systems for multi-tenant buildings and more particularly to a system for monitoring energy use and for allocating the expense thereof pro-rata among said tenants.

2. Description of the Prior Art

It is generally known in the operation of apartment houses and commercial buildings that when individual tenants are responsible for payment of heating and cooling expenses the energy costs for the building are less than when such expenses are included in the rental. Where the entire building is heated and cooled by a common heating and cooling system, allocation of energy costs among the various tenants according to their respective energy usage requires a system for accurately monitoring such usage.

Prior to the present invention various systems have been devised for the purpose of monitoring energy usage. Typical of the prior art are U.S. Pat. Nos. 4,002,890 and 4,234,927. Each of these systems require that the temperature in each apartment or commercial unit be monitored. To this end one or more temperature sensors must be located in or near each unit such as in the return air plenum. Each such sensor must be coupled to a remote working location for processing. While such systems could conceivably be installed with relative ease during the construction of new buildings, the same is not true of existing structures.

OBJECTS AND SUMMARY OF THE INVENTION

From the foregoing discussion, it will be understood that included among the various objectives of the present invention are included the following:

the provision of a new and improved system for monitoring energy usage in a multi-unit building;

the provision of a system of the foregoing character for accurately allocating the energy cost among the building units; and the provision of a system of the above described character which does not require the temperature of each unit to be monitored.

These and other objects, features and advantages of the present invention are efficiently achieved by providing a clock circuit which generates a stream of output pulses at a selected frequency. The thermostat of each unit is coupled together with the clock output to the respective inputs of an AND gate which passes the clock output pulses only when the thermostat calls for heating or cooling. Each AND gate output is coupled to a respective counter which accumulates the clock pulses representing the thermostat on-time over a preselected interval of time. The counters are periodically scanned by a microprocessor and the on-time for each thermostat is stored together with data representing total energy consumption for the building. At the end of each selected billing interval, the energy expense is allocated to each unit according to usage.

BRIEF DESCRIPTION OF THE DRAWING

The single appended drawing is a schematic block diagram of an energy use monitoring system in accordance with the principles of the present invention.

DETAILED DESCRIPTION OF THE INVENTION

With reference now to the drawing, there are shown a plurality of thermostats $10_1$–$10_N$ each of which may be identified with a particular tenant or energy consumer. Each thermostat 10 is in essence an on/off switch, which when closed, causes heating or cooling to be delivered from the common plant to the unit with which each thermostat is associated. A clock circuit 12 generates a stream of output pulses at the selected frequency. The applicant has found that a frequency of one pulse per second is sufficient for accurate operation of the system. The clock circuit 12 output and each thermostat 10 output are coupled to the inputs of respective AND gates $14_1$–$14_N$ such that when a given thermostat is on, clock pulses are passed by the respective gate 14 to a counter $16_1$–$16_N$. Each counter accumulates clock pulses over a predetermined time period (e.g. one minute), the number of which represents the amount of time the respective thermostat was on during the period. The outputs of counters 16 are coupled through an input-/output buffer 18 to a central processing unit 20. The central processing unit 20 is also coupled to a random access memory 22 and a programmable read only memory 24, as well as a calendar clock 26. The central processing unit 20 causes each counter 16 to be scanned at a frequency of at least once per unit time as determined by the clock circuit 12 output rate and counter 16 storage capacity. By way of example, if the clock 12 output is one pulse per second and the counters have a capacity of sixty pulses, the scanning rate would be at least once per minute.

The on-time for each individual thermostat $10_{1-N}$ as well as the sum of the on-time for all thermostats 10 is stored in the random access memory 22 and that data is updated on each scanning cycle for a preselected calendar period (e.g. one month). The total amount of energy used by the entire building may also be monitored by applying the clock 12 output together with a signal representing the consumption of energy to AND gate 28. The energy consumption signal may be derived for example from the on/off state of a solenoid operated gas valve in a furnace or a compressor in an air conditioning system, either being represented as an energy flow control 30. As with the individual thermostats 10 the output of AND gate 28 is applied to a counter 32 which is periodically scanned to derive data representing total energy consumption which is also stored in the random access memory 22. The outputs of all AND gates $14_{1-N}$ may also be coupled to a NAND gate 31 to derive a pulsed signal when any thermostat $10_{1-N}$ in the building is on. This signal is applied to a counter 33 which accumulates clock pulses representing the time a furnace fan or water pump is on. In some systems such as a forced hot air system, the furnace fan may operate to deliver heat to a given unit even though the fuel flow may be off. By using NAND gate 31 and counter 33 the electrical operating expenses of the system may also be monitored in the same manner as the energy consumption by periodically scanning counter 33. A keyboard 34 and printer 36 provide user access to the system and a modem 38 may be provided for access from a remote location.

At the end of an accounting period the central processing unit 20 sums the on-time for all thermostats 10 for that period. That sum is then divided by the on-time for each individual thermostat to determine the percentage of the total that each unit in the building was responsible for heating or cooling. If desired, the total energy consumed, as derived from the energy flow control 30, may also be multiplied by the appropriate utility rate entered via keyboard 34 to determine total energy cost for the accounting period. Properly allocated utility bills may then be prepared using printer 36.

The energy use monitoring system of the present invention does not require the location of any of its components within the individual units in the building since the thermostat state may as easily be sensed at the heating/cooling unit location. It is therefore unnecessary that any additional wiring be run to the individual units.

From the preceding discussion, it will be seen that the applicant has provided an energy use monitoring system whereby the objectives set forth hereinabove are efficiently attained. Since certain changes in the above-described construction will occur to those skilled in the art without departure from the scope of the invention, it is intended that all matters set forth herein or shown in the appended drawing shall be interpreted as illustrative and not in any limiting sense.

Having described what is new and novel and desired to secure by Letters Patent, what is claimed is:

1. A system for monitoring energy use by each of a plurality of users of a common heating/cooling system wherein each said user is provided with an individual on/off state thermostat coupled to said system such that when any thermostat is in the on state heating/cooling is provided to the respective user, said energy monitoring system comprising
    means for generating clock pulses at a preselected frequency;
    a plurality of first gating means, one associated with each of said individual thermostats, having a first input coupled to its respective thermostat, having a second input coupled to said clock pulse generating means, and an output whereby clock pulses are passed to the output of said plurality of first gating means at any time the associated thermostat is on;
    a plurality of first counting means, one associated with each of said first gating means, having an input coupled to the output of and operative to count the clock pulses passed by its respective first gating means;
    means for periodically scanning each of said plurality of first counting means to determine the number of pulses counted thereby since the next previous scan thereof; and
    means coupled to said scanning means for accumulating the number of pulses counted by each individual counting means during a preselected interval of time and generating an output signal indicating the total amount of time that each said thermostat was on during said interval of time.

2. The system as described in claim 1 further including
    means for summing the number of pulses counted by all of said plurality of first counting means during said interval of time, and generating an output signal indicating the total amount of time that all of said thermostats were on during said interval of time; and
    means coupled to said accumulating means and to said summing means for dividing the output of said accumulating means for each said thermostat by the output of said summing means to thereby produce an output signal representing the percentage of said total amount of time that each individual thermostat was on during said interval of time.

3. The system as described in claim 2 further including
    second gating means having a plurality of inputs, one coupled to each output of said plurality of first gating means and operative to pass clock pulses when any of said plurality of thermostats is on;
    second counting means having an input coupled to the output of said second gating means, operative to count the clock pulses passed by said second gating means and an output coupled to said scanning means; and
    said accumulating means further operating to accumulate the number of pulses counted by said second counting means during a preselected interval of time and to generate an output signal representing the total amount of time that any of said plurality of said thermostats were on during said interval of time.

4. The system as described in claim 2 wherein said heating/cooling system is provided with an on/off state energy flow control and further including
    third gating means having a first input coupled to said energy flow control a second input coupled to said clock pulse generating means and an output whereby clock pulses are passed to the output of said third gating means at any time said energy flow control is on;
    third counting means having an input coupled to the output of said third gating means, operative to count the clock pulses passed by said third gating means and an output coupled to said scanning means; and
    said accumulating means further operating to accumulate the number of pulses counted by said third counting means during a preselected period of time and generating an output signal representing the total amount of time during said preselected interval of time that energy was flowing to said heating-/cooling system.

5. The system as described in claim 3 further including
    means for generating and storing a signal representing the operating expense per unit time of said heating/cooling system due to any of said thermostats being on;
    said accumulating means further operating to multiply said operating expense signal by the signal representing the total amount of time that any of said plurality of said thermostats were on during said period of time to thereby produce an output signal representing the operating expense of said heating/cooling system during said interval of time and further to multiply the signal representing said operating expense during said interval of time by the signal representing the percentage of the total time that each individual thermostat was on during said interval of time to thereby allocate said operating expense amoung said plurality of users.

6. The system as described in claim 4 further including
 means for generating and storing a signal representing the energy expense per unit time of energy flowing to said heating/cooling system;
 said accumulating means further operating to multiply said energy expense signal by the signal representing the total amount of time during said preselected interval of time that energy was flowing to said heating/cooling system to thereby produce an output signal representing the energy expense of said heating/cooling system during said interval of time; and
 further to multiply the signal representing said energy expense during said interval of time by the signal representing the percentage of the total time that each individual thermostat was on during said interval of time to thereby allocate said energy expense among said plurality of users.

* * * * *